United States Patent [19]

Linder

[11] 3,976,472

[45] Aug. 24, 1976

[54] METHOD AND AN ELECTRICALLY HEATED DEVICE FOR PRODUCING MOLTEN METAL FROM POWDERS OR LUMPS OF METAL OXIDES

[76] Inventor: Rolf Linder, Skjutarevagen 7, 77 200 Grangesberg, Sweden

[22] Filed: May 15, 1974

[21] Appl. No.: 469,983

[30] Foreign Application Priority Data

May 17, 1973 Sweden .......................... 73070229

[52] U.S. Cl. ................................. 75/10 R; 75/11; 75/42
[51] Int. Cl.² ....................... C21C 5/52; C21B 5/06
[58] Field of Search ............ 75/11, 26, 34, 42, 10 R

[56] References Cited
UNITED STATES PATENTS

| | | | |
|---|---|---|---|
| 2,894,831 | 7/1959 | Old | 75/26 |
| 2,973,260 | 2/1961 | Nogiwa | 75/26 |
| 3,140,168 | 7/1964 | Halley | 75/26 |
| 3,224,871 | 12/1965 | Collin | 75/34 |
| 3,236,628 | 2/1966 | von Bogdandy | 75/42 |

*Primary Examiner*—Peter D. Rosenberg
*Attorney, Agent, or Firm*—Ladas, Parry, Von Gehr, Goldsmith & Deschamps

[57] ABSTRACT

This invention is related to a method and a process for producing metals by reducing and smelting metal oxides in two steps, the first of said steps comprising prereduction of a metal oxide charge. The prereduced metal oxide is transferred directly to the second step comprising final reduction of the prereduced metal oxide in an electrically heated smelting furnace with hydrocarbon containing reducing agent.

A cooling agent is injected into the reaction gases evolved from the smelting furnace to cool said gases to a temperature at which they can be transferred directly to the prereduction furnace as reducing agent without causing sticking of the charge in said furnace. The cooling agent is especially selected so as to increase the molar quantity of reducing gas by chemical or physical interaction with the reaction gas from the smelting furnace.

39 Claims, 3 Drawing Figures

METHOD AND AN ELECTRICALLY HEATED DEVICE FOR PRODUCING MOLTEN METAL FROM POWDERS OR LUMPS OF METAL OXIDES

This invention is related to a method and an electrically heated device for producing a liquid metal melt from metal oxides by drying heating, reducing and melting said oxides and the metal prepared by reducing said oxides and in which said oxides may consist of powders or small lumps and the reducing agent essentially consists of highly bituminous coals, oil, tar, pitch, methane or other solid, liquid or gaseous hydrocarbon-containing materials. Coal with low content of volatile constituents may also partly be used as a reducing agent. The apparatus to some extent resembles an electric blast-furnace with an electrically heated hearth and a shaft, rotating furnace or another device for pre-reduction arranged above said hearth.

It is previously known to reduce and melt metal oxides with a reducing agent which essentially consists of coal or coke in electric furnaces with a high or low shaft. When said shaft is high, it is necessary to use a charge consisting of lumps, i.e. lump ore or agglomerates such as pellets or sinter in order to achieve acceptable gas penetration and distribution. Under said conditions and for the same reason and reducing agent must consist of so-called metallurgical coke with high strength. The request for using the metal oxide as well as the reducing agent in the shape of lumps causes additional costs, which are so high that said electric furnaces, e.g. of the Elektrometall type, are not economically competitive compared with other reducing and melting furnaces, e.g. conventional blast-furnaces. When using a low shaft, the requests as regards particle size and physical strength of the charge are lower, but are still present, and simultaneously the indirect reduction with gas in the shaft is considerably reduced, which causes an increase of the consumption of electric energy in the lower part of the furnace. Since carbon is used as the essential reducing agent, the quantity of reducing gas emanating from the end reduction part is insufficient for achieving a high degree of reduction of the metal oxide before said oxide is added to the electrically heated part of the furnace in which the final reduction and melting is performed. Said simultaneously occurring final reduction and melting of the metal oxide (MeO) with direct consumption of carbon (C) is usually called "smelt reduction", in which process carbon monoxide is evolved according to the reaction formula:

$$MeO + C \rightarrow Me + CO.$$

The consumption of electric energy in said furnaces amounts to about 2000 kWh/ton metal.

In the so-called Lubatti-furnace fine-grained metal oxide mixed with carbon is placed in a layer above the layers of molten metal and slag in an electric melting furnace without regular shaft. The heat energy for reduction is released by passing an electric current from submerged electrodes through the slag layer. The evolved carbon monoxide only exercises a slight reducing effect due to the fact that the residence time for passing through the layer of metal oxide is very short. Also in this case the quantity of evolved carbon monoxide is relatively small. In said type of furnace the electric energy consumption amounts to about 2500 kWh/ton metal and the productivity therefore is relatively low. Furthermore, there are a number of systems in which the final reduction is performed in electric furnaces of the type previously described (Tyseland-Hole, etc.) of a metal oxide which is reduced in advance with solid fuel in rotating furnaces which are heated by burning the carbon monoxide emanating from the electric furnace. Said systems are characterized by a high total energy consumption and require additional investments for rotating furnaces. The drawbacks of the systems described above for reducing metal oxides can be summarized as follows:

a. When using a high shaft for achieving good indirect reduction it is necessary to use agglomerated metal oxide and coke with good strength characteristics.

b. When using a lower shaft the requests on the strength of the agglomerates and the reducing agent are decreased, but the indirect reduction with gas is low and the electric energy consumption is correspondingly high.

c. When working without a shaft, e.g. in a furnace of the Lubatti type, the consumption of electric energy is increased further and amounts to about 2500 kWh/ton of metal. The productivity in said type of furnace is low.

d. In all previously tried furnace types carbon is used as reducing agent, which means that the quantity of gas available for pre-reduction is about half the quantity which could be obtained if oil ($CH_2$) could be used. If methane ($CH_4$) can be used, the quantity of reducing gas is about three times as large as when using carbon.

It is a purpose of this invention to avoid said drawbacks and decrease the costs for preparing the molten metal by using oil or other materials with a high content of hydrocarbon, such as solid carbonceous materials with a high content of volatile constituents, and also gaseous reducing agents, such as natural gas, methane, $CH_4$, as reducing agent and to use simultaneously the mixture of carbon monoxide and hydrogen evolved from the electrically heated smelt reduction section in a rational manner for pre-reducing the metal oxide in a vertical multiple-hearth furnace, rotating furnace or other suitable device arranged above the smelt-reduction hearth.

The reducing agent may also in addition to oil or gas comprise a certain amount of other carbonaceous materials, such as coal or coke dust, bituminous coal, etc. Preferably the total atomic ratio of C/H of the reducing agent should not exceed 1:0,5 especially not exceed 1:1,0–1,2 and especially not exceed 1:1,4–1,5 corresponding to a content of solid carbon in carbonaceous materials or such materials mixed with oil of at most 70 % at most 50–40 % resp. at most 30–25 % of said mixture. Such ratio may be accomplished with only solid materials with a high content of volatile materials.

The energy required in the smelt-reduction section is mainly or entirely supplied as electric energy, preferably by passing an electric current through the layer of pre-reduced metal oxide and reducing agent or cracking products of the reducing agent floating on or mixed with the layers of slag and metals which occupy the rest of the hearth. In the Labatti furnace the electric current is passed through the slag layer, and this may also in the process of this invention be a suitable manner for supplying a larger or smaller part of the resistance heat energy required for the work of reduction. The principle of this invention does not exclude the possibility of passing some part of the electric current also through the layer of molten metal below the slag layer, (where it also might be generated through suitable induction coils). The electric energy is supplied e.g. through water-cooled metal electrodes of suitable construction where are submerged to a certain depth into the various layers to achieve in this way a suitable distribution of the electric current. When the electrodes consist of carbonaceous material also electric arcs might be formed and the electrodes are consumed at a rate which is normal for such furnaces. This is, however, no larger disadvantage since said types of electrodes can be fed continuously into the furnace and simultaneously the consumed carbon participates in the process as a reducing agent. The temperature in the electrically heated furnace section should be sufficiently high so that the slag as well as the metal or the carbon-containing alloy formed from said metal are highly fluid and can be tapped from the furnace without difficulty batchwise or continuously. The temperature in the layer of pre-reduced metal oxide and reducing agent must also be sufficiently high so that the end reduction in said part occurs rapidly. It is a further request that the temperature in said layer is above the melting point of the formed, especially carbon-containing metal alloy and slag, respectively. In order to obtain a slag with a suitable viscosity value and sulphur removing effect it is suitable to add lime in the smelt-reduction section. When using oil as hydrogen-containing reducing agent, the reducing agent (oil or e.g. an emulsion of coal in oil) is injected, optionally after preheating, from conventional tanks or containers with pumps directly on the layer of pre-reduced hot metal oxide floating on the slag in the furnace through nozzles arranged in the roof or sides of the smelting furnace section. Optionally a part of the oil may be injected below the surface of the molten slag or metal. The result is an instantaneous cracking of the oil so that some destillation products and gaseous cracking products are evolved and are carried with the gas emanating from the reduction process into the pre-reduction furnace. Said part of the process may contribute to essential inventive characteristics, i.e. to a reduction the temperature of the gases passing into the pre-reduction furnace to a level below the temperature at which the pre-reduced and probably metal-coated metal oxide particles stick together and agglomerate and also to an increase of the volume of the reducing gas evolved from the smelting furnace section to make said volume sufficient for the required pre-reduction in the pre-reduction section. When the gas temperature is too high, the pre-reduction furnace can be blocked entirely. For controlling such phenomenons in a satisfactory manner this invention comprises reducing the temperature of the gas evolved in the smelting furnace to a level at which over-heating and sticking is avoided in the pre-reduction furnace. Simultaneously it is usually preferable to keep the temperature of the gas as high as possible. When reducing iron ore the suitable gas temperature is normally within the range 700° to 1200° C and preferably 800° to 1.000°–1.100° C. The necessary temperature reduction of the gas evolved from the smelting furnace usually is about 100° to 900° C and especially about 200° to 600° C. Said temperature reduction can according to the invention be achieved by the introduction of water, water vapour, carbon dioxide ($CO_2$) hydrocarbons with or without addition of air or other cooling, liquid or gaseous agents into the gas which passes from the smelting furnace and is introduced into the pre-reduction furnace. In this manner it is possible to control closely the temperature of the gas which is introduced into the lower part (discharge end) of the pre-reduction furnace and simultaneously the gas volume available for reduction is increased. Said materials can also be injected onto the metal oxide layer or optionally be mixed with the reducing agent before it is added to the smelting furnace. At the temperatures in question, usually within the range 1100° to 800° C the equilibrium of the water-gas reaction is obtained rapidly.

This addition of cooling agent to the gases which are evolved from the smelting furnace simultaneously by energy transformation and reactions gives an increase of the volume of reducing gases which are transferred to the pre-reduction section. This is an essential part of the idea of invention since said effect makes certain that the volume of reducing gas which is required for the pre-reduction is reliably produced. Another possible method for achieving a temperature reduction of the gas before the introduction into the reduction shaft is to substitute the addition of e.g. lime mentioned above, which is requested for the formation of slag, with materials which are decomposed with formation of e.g. carbon dioxide or water, such as limestone ($CaCO_3$). Thermal decomposition to CaO and $CO_2$ is then obtained in the reduction layer with energy consumption. The evolved carbon dioxide will, however, partly react with carbon from the reducing agent with formation of CO and therefore also said method can be used for increasing the volume of CO supplied to the shaft. For obtaining a high pre-reduction rate and a good heat supply to the shaft the inlet gas temperature should, however, be kept as high as possible without causing difficulties with sticking or agglomeration of the charge. The pre-reduction shaft, which may have the shape of an empty cylindrical space in which the ore particles are reduced when falling down the shaft, may also according to one possible embodiment consist of a device which resembles a multi-hearth furnace. The pre-reduction shaft may be provided at the lowermost part with suitable means for distributing the produced pre-reduced metal oxide over a large part of the entire surface of the underlying smelt-bath surface. Said device may consist of simple tubes which distribute the material over the furnace area, but it may also consist of e.g. a rotating disc which distributes the particles circularly over the bath area. Reciprocating rakes may also be used in combination with the embodiments disclosed above. The pre-reduction furnace is constructed with an effective vertical extension and a number of hearths which permit a satisfactory use of the heat content and reducing power of the available reducing gases. It is known that many metal oxides comparatively rapidly can be reduced with gas to 50–70 %, whereas further reduction occurs increasingly slowly, since a metal layer formed on the surface of the particles slows down further transport of oxygen. In a furnace according to the invention it is sufficient e.g. when reducing iron ore to obtain a degree of pre-reduction of 20–80 %, preferably 40–60 %, e.g. 50 %. When the reduction is carried out further, the volume of reducing gases evolved from the smelting furnace will be decreased.

The part of the total reduction work which is performed in the pre-reduction furnace is mainly performed with the reducing temperature-adjusted gases transferred from the smelt-reduction furnace. A minor part, normally up to 10–30 % of the reduction work may be performed with other reducing agents, e.g. solid reducing agents, such as bituminous coal, breeze, etc., which may be mixed into the charge, preferably after a pre-heating treatment. A certain degree of balance between available and necessary reducing gas volume will automatically be achieved.

The reactions of the gas-reduction are normally endothermic, i.e. require heat, and therefore it is necessary for achieving a balance between required and available heat energy to dry and preheat the metal oxide (ore) before introducing it into the pre-reduction furnace. The maximum pre-heating temperature is normally determined by the tendency of the charge to stick or agglomerate. For iron oxide the temperature is usually 800° to 1100°–1200° C.

This is achieved according to the invention by using the remaining physical and chemical heat in the reduction gas effluent. Said gas is burnt with air which is injected into the gas through suitably arranged nozzles or conduits. It is within the scope of the invention to perform the preheating in the multiple-hearth furnace in which the pre-reduction is carried out or in a separate device, such as a rotating furnace of conventional construction, from which the dried and preheated metal oxide is delivered to the intake opening of the pre-reduction furnace. In the former case nozzles for introducing combustion air are arranged at a suitable level in the pre-reduction furnace regularly distributed around the shaft. Said air may be preheated in an air preheater arranged outside the shaft, using the remaining physical heat in the gases escaping from the preheating part of the pre-reduction shaft. The heat content of the off-gases may optionally also be recovered in a waste gas boiler. The waste gas should finally be subjected to a dust-removing treatment in an electrofilter before being discharged to the atmosphere. Purification in a cyclon before the heat exchanger or waste gas boiler may also be required. The metal oxide is fed to the drying and preheating section with a feeder of conventional construction at an even and controlled rate from bins or containers of conventional construction.

The particle size of the ore may vary within relatively broad limits. The size should be large enough to prevent excessive dust losses and sintering and small enough to give the necessary degree of pre-reduction. The maximum size also depends on the porosity, the maximum size of a more porous or easily reducible ore being larger. A normal size of solid iron ore is 0.1 to 15 mm and especially 0.1 to 8 mm. When producing iron a preferred starting material is iron oxide, such as hematite or magnetite, which in the pre-heating step is partly or entirely oxidized to $Fe_2O_3$.

Figure 1:
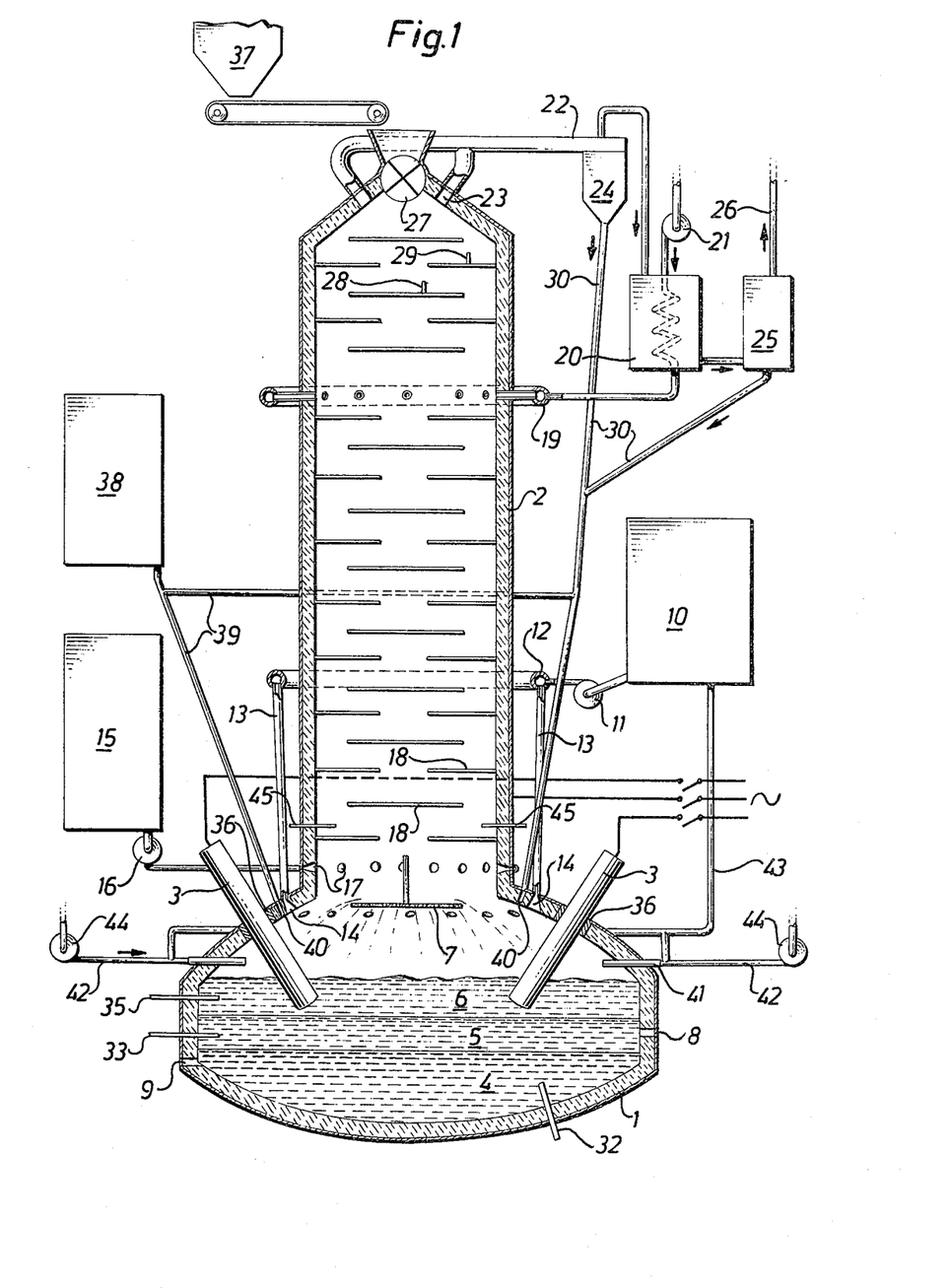

An embodiment of the apparatus is disclosed in the enclosed FIG. 1 and explained with an example of the use of said apparatus for producing a carbon-containing molten iron melt from iron ore concentrate with oil as reducing agent and graphite electrodes for supplying electric energy to the reduction layers, in which the end reduction is carried out. The apparatus comprises a circular melting and reduction furnace 1 with a suitable refractory ceramic lining, which is provided with a roof through which three or more electrodes 3 are inserted through water-cooled, tightly sealing sleeves. The electrodes are connected to the electric power net 44. The electrodes reach down into or through the final reduction layer 6, floating on the slag layer 5, which floats on the metal layer 4. The boundary between the layers 6 and 5 is not necessarily sharp, and reduction can be maintained also if there is a certain degree of mixing of said layers. The furnace is provided with tapping openings 8 and 9, through which slag and molten metal, respectively, can be tapped continuously or at intervals. The temperature in the metal, the slag and the reaction layer is measured and controlled with thermocouples 32, 33 and 35. Centrally above the melting furnace there is arranged a multiple-hearth reduction furnace provided with rotating rakes 28, 29, which bring the ore concentrate to fall from hearth to hearth down to hearth 18 said ore concentrate passing in countercurrent to the reducing gases and being pre-reduced by said gases. From the last stage the ore concentrate falls down on a rapidly rotating perforated distributor 7 spreading the ore concentrate circularly over the reaction layer 6.

Figure 2:
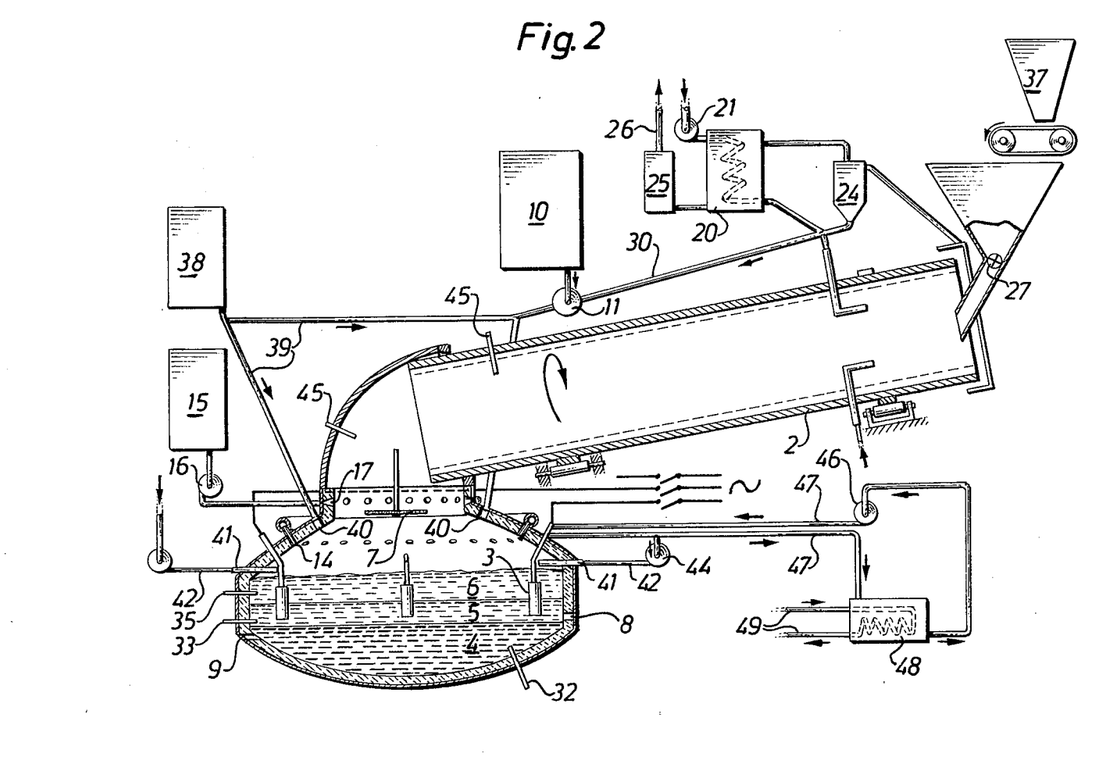

Reducing agent consisting of oil is added to the reaction layer 6 from container 10 to a pump 11 and a circular conduit 12 through tubes 13 to nozzles 14, which are arranged regularly distributed in the roof around the shaft. From a container 15 a liquid or gaseous cooling agent is introduced through a pump (fan) 16 and nozzles 17 into the lower part of the pre-reduction shaft. In the upper part of said pre-reduction shaft combustion air is introduced at a suitable level from a circular conduit 19, which is fed from a heat exchanger 20 through a fan 21. The waste gases from the shaft are introduced into the heat exchanger 20 through a conduit 22, which is connected to a number of regularly distributed gas escape openings 23 in the uppermost part of the shaft. In said part there is arranged a suitable lock feed device 27 for feeding wet and cool ore concentrate, said device being shown in the figure as a rotating power lock valve. To said lock valve the ore concentrate is fed from a container 37 by means of a band conveyor. The waste gases before being introduced into the heat exchanger pass through a dust-removing cyclon 24 and an electrofilter 25 and are finally discharged to the atmosphere through a chimney 26. The dust removed in the gas purifying step is returned through a conduit 30 and inlet opening 40 to the smelting furnace section. Lime or limestone is also introduced into said furnace section from a container 30 and a conduit 39, preferably through the same inlet openings in the roof 40. When starting the apparatus, the smelting furnace as well as the multiple-hearth furnace must be suitably preheated, which is performed with oil burners 41, to which oil is fed from the tank 10 through a conduit 43 and air from a fan 44 through conduits 42. The temperature of the reducing gas evolved from the smelting furnace is controlled with thermocouples 45 arranged in the lower part of the shaft furnace. The temperature values measured by said thermocouples are used for automatically controlling the quantity of cooling agent added, so that the addition through the nozzles 17 is lowered when the temperature is below the selected value. When the temperature is too high, the quantity of cooling agent fed is automatically increased. On FIG. 2 there is disclosed another embodiment in which water-cooled metal electrodes 3 are used in the smelting furnace, and the pre-reduction and preheating is performed in a rotating furnace 2 of conventional construction. The reference numerals correspond to the numerals in FIG. 1, but the apparatus on FIG. 2 also comprises a device for supplying cooling water to the electrodes. Cooling water of boiler quality is passed to and from the electrodes 3 through conduits 47 with a pump 46 which also forces the water through a cooler 48, in which external water from a conduit 49 is used for cooling.

Figure 3:
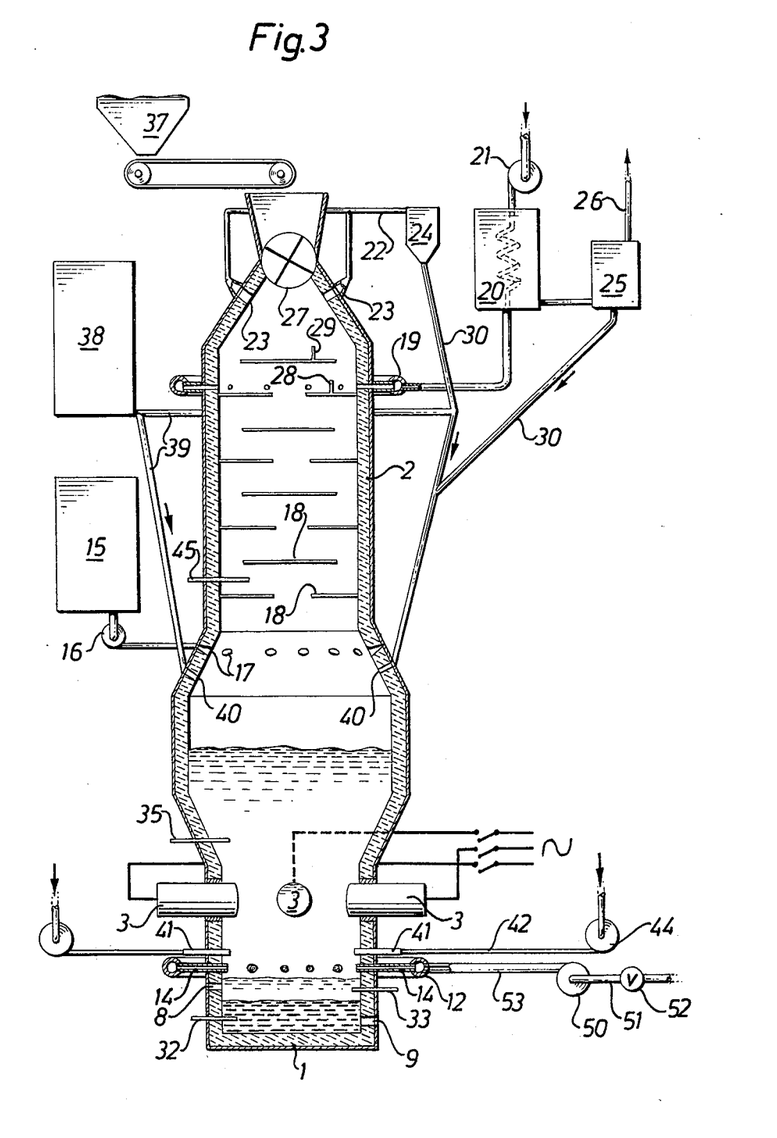

FIG. 3 discloses an embodiment in which methane and/or liquid hydrocarbons is injected at a low level above or into the slag layer for forming an emulsion of slag, metal and iron oxide, which is heated by electric arcs extending between electrodes inserted into the shaft. On said FIG. 12 is an annular conduit 53 from a fan 50 which through a conduit 51 and valve 52 is connected to an external natural gas conduit. In an other embodiment the prereduction furnace comprises one or more fluidized beds or cyclon furnaces preferably arranged above the smelt reduction furnace. The reducing gases derived from the smelt reduction furnace are given a pressure high enough to create the desired agitation of the metal oxide in the prereduction furnaces. A calculation of the material and heat balance of the various furnace sections when running the apparatus with highly concentrated magnetite and various reducing agents gives per ton of molten metal the consumption of reducing agent and electric energy stated below:

| Reducing agent | coal | oil $(CH_2)$ | methane $(CH_4)$ |
|---|---|---|---|
| kg/ton of liqu. iron | 244 | 200 | |
| $Nm^3$/ton of liqu. iron | | | 314 |
| Electric energy kwh/ton of liqu. iron | 875 | 1080 | 1050 |

If a cooling agent consisting of liquid water is added so that the temperature of the reducing gases at the inlet to the pre-reduction shaft is reduced to 900° C, so that sticking is avoided, and if simultaneously the concentrate in the upper part of the shaft is preheated to about 1100° C, the available heat is sufficient for covering the heat requirement for reduction of the iron oxide to 50 %, i.e. each mole of $Fe_3O_4$ is transformed into 1 Fe + 2 FeO. The gas composition at the inlet to the shaft is in percent by volume:

| gas composition % by volume | Reducing agent | | |
|---|---|---|---|
| | Coal % | oil % | methane % |
| CO | 38,4 | 33,7 | 21,7 |
| $CO_2$ | 6,2 | 4,6 | 2,9 |
| $H_2$ | 44,7 | 50,8 | 62,6 |
| $H_2O$ | 10,7 | 10,9 | 12,8 |

The gas therefore is sufficiently reducing for transforming FeO into Fe. In the upper part of the shaft immediately before the air injection the gas composition is in percent by volume:

| Gas composition % by volume | Reducing agent | | |
|---|---|---|---|
| | coal % | oil % | methane % |
| CO | 18,4 | 20,3 | 16,7 |
| $CO_2$ | 26,2 | 18,0 | 7,9 |
| $H_2$ | 33,0 | 26,0 | 42,9 |
| $H_2O$ | 22,4 | 35,7 | 32,5 |

The gas thus is sufficiently reducing for transforming $Fe_3O_4$ into FeO in the initial stage. The remaining physical and chemical heat in the reducing gas immediately before the air injection is sufficient for drying the ore concentrate (based on 3 % moisture content) and heating to about 1100° C.

The waste gas escaping from the shaft has furthermore a certain residual heat content, which can be used for preheating the combustion air and for generating electric energy in a waste gas boiler.

A schematic economic calculation is here given as a comparison with the conventional blast-furnace. If it is supposed that for the same capacity the investment costs, the labour costs and the maintenance costs are equal, there is when using water-cooled metal electrodes only a difference as regards fuel and energy costs, whereas the costs for agglomerating the concentrate must be added to the blast furnace costs.

The method according to the invention saves investments costs for an agglomerating plant as well as a coke oven plant. A calculation of costs gives the following results.

| Blast furnace | Sw.Crs./ ton liquid iron |
|---|---|
| Coke 0,5 ton at 180 Sw.Crs./ton | 90 |
| sintering 1,6 tons of ore concentrate at 11 Sw.Crs./ton (inclusive limestone) | 18 |
| | 108 |
| Additional investment costs for sintering plant and coke oven plant | 30 |
| | 138 |
| Smelt reduction plant according to the invention | |
| a) reducing agent: coal | |
| Coal: 244 kgs at 70 Sw.Crs./ton | 17 |
| Electric energy: 875 kwh at 0,05 Sw.Crs./ton | 44 |
| Lime (CaO) 110 kg at 60 Sw.Crs/ton | 7 |
| Total costs | 68 |
| b) reducing agent: oil | |
| Oil: 200 kgs at 120 Sw.Crs./ton | 24 |
| Electrical energy: 1080 kwh at 0,05 Sw.Crs/kwh | 54 |
| Lime (CaO) 100 kgs at 60 Sw.Crs./ton | 6 |
| Total costs | 84 |
| c) natural gas | |
| Natural gas: 314 $Nm^3$ at 0,08 Sw.Crs./ton | 24 |
| Electric energy: 1050 kWh at 0,05 Sw.Crs./kWh | 53 |
| Lime (CaO) 100 kgs at 60 Sw.Crs./ton | 6 |
| Total costs | 84 |

From the calculations above it is obvious that when using coal in the smelt reduction plant according to the invention the cost saving amounts to 70 Sw.Crs./ton of liquid iron. If oil or natural gas is used the cost saving will be smaller, i.e. 54 Sw.Crs./ton of liquid iron.

As stated above this invention is related to reduction of powderous or particulated oxidic ore to molten metal by reduction in two different steps comprising pre-reduction with reducing gas and final reduction with solid, liquid or gaseous reducing agent at a temperature at which the reduced metal and slag is in a molten state. The treated metal oxides should be reducable to a sufficient extent at temperatures which prevent agglomeration or sticking of the oxide or metal in the pre-reduction step when using the gases which after cooling are transferred to the pre-reduction step. Said reducing gases are essentially CO and/or $H_2$ whereas $CH_4$ and other hydrocarbons are of minor importance. The method has been discussed above in combination with the reduction of iron oxide but can also be used for a number of other metal oxides which are more easily reducible or somewhat less easily reducible than iron. In the following a number of such metals and oxides are exemplified.

1. Copper.

Copper oxide CuO is more easily reducible than hematite $Fe_2O_3$ at all temperatures up to 1430°C. According to the invention reduction to lower oxides $Cu_2O$ or to metal can be performed in the pre-reduction step at lower temperatures than for iron according to the reactions:

$$2 CuO + CO \rightarrow Cu_2O + CO_2$$
$$2 CuO + H_2 \rightarrow Cu_2O + H_2O$$
resp.
$$CuO + CO \rightarrow Cu + CO_2$$
$$CuO + H_2 \rightarrow Cu + H_2O$$

2. Lead.

Lead oxide PbO is more easily reducible that magnetite $Fe_3O_4$ at all temperatures. According to the invention reduction of lead oxide to metallic state can be performed in the pre-reduction step according to the following reactions:

$$PbO + CO \rightarrow Pb + CO_2$$
$$PbO + H_2 \rightarrow Pb + H_2O$$

3. Nickel.

Nickel oxide NiO is at all temperatures reduced to nickel metal more easily than magnetite $Fe_3O_4$ is reduced to wustite FeO or wustites is reduced to metallic iron. The reaction in the pre-reduction step is according to one or both of the following reactions:

$$Ni_2 + CO \rightarrow Ni + CO_2$$
$$NiO + H_2 \rightarrow Ni + H_2O$$

4. Cobolt.

Cobolt oxide CoO is more easily reducible than $Fe_3O_4$ up to 1250°C by the same reactions as nickel.

5. Tin.

Tin oxide $SnO_2$ is at all temperatures above 400°C. more easily reducible than $Fe_3O_4$ in direct reduction to Fe and at temperatures above 750°C. insignificantly less reducible than $Fe_3O_4$ when reduced to FeO. $SnO_2$ is at all temperatures more easily reducible than wustite FeO when reduced to metallic iron. The reactions are:

$$SnO_2 + 2CO \rightarrow Sn + 2CO_2$$
$$SnO_2 + H_2 \rightarrow Sn + 2H_2O$$

Either of said reactions can comprise the intermediate product SnO, e.g.

$$SnO_2 + CO \rightarrow SnO + CO_2$$
$$SnO + CO \rightarrow Sn + CO_2$$
which gives: $SnO_2 + 2CO \rightarrow Sn + 2CO_2$

6. Zinc.

Zinc oxide SnO is at all temperatures below 1200°C. less easily reducible than wustite FeO when reduced to metallic iron. The oxygen potential in the system $2Zn + O_2 \rightarrow 2ZnO$ is at about 1200°C. higher than the oxygen potential in the system $CO + O_2 \rightarrow Co_2$ and at about 1300°C. higher than the oxygen potential in the system $2H_2 + O_2 \rightarrow 2H_2O$. Zinc metal is, however, vapourized already at 900°C. and therefore the reaction:

$$ZnO + CO \rightarrow Zn + CO_2$$
resp. $$ZnO + H_2 \rightarrow Zn + H_2O$$

will procede from left to right already above 900° C since Zn metal formed by the reaction escapes together with the reduction gases in the vapour state. Thus the process and apparatus according to the invention just as other methods and furnaces for the production of zinc must be provided with condensing means for the collection of liquid zinc.

7. Manganese.

$MnO_2$ in the first hand but also MnO can be reduced as CO resp. $H_2$ at temperatures which can suitably be used in the pre-reduction step of this process and apparatus. This is based on the fact that the reaction products $CO_2$ resp. $H_2O$ are continuously removed with the reduction gas from the reaction surface of the oxides. The reaction can be written:

$$MnO_2 + CO \rightarrow MnO + CO_2$$
$$MnO_2 + H_2 \rightarrow MnO + H_2O$$
resp. $$MnO + CO \rightarrow Mn + CO_2$$
$$MnO + H_2 \rightarrow Mn + H_2O$$

Pre-reduction to a sufficient extent by the claimed process and apparatus can be obtained at usable temperatures in the pre-reduction step.

8. Chromium.

Chromium oxides are comparable with manganese oxides as regards reducibility. The higher oxide $Cr_2O_3$ and the formed native mineral chromite $FeCrO_4$ can be partially reduced to oxides of lower valency in the pre-reduction step of the claimed process and device at practically useful temperatures. The less easily reducible oxides of manganese and chromium are suitably treated by the process and device according to the invention in mixture with iron oxides which have been pre-reduced in the upper part (pre-reduction part) of the reduction apparatus. The final reduction of iron oxide and reduction of manganese and chromium oxide is then performed in the melt reduction step. CO and $H_2$ formed by the reduction of manganese or chromium oxides with carbons or hydrocarbons are suitably used for the reduction of iron oxide in the pre-reduction step.

I claim:

1. An improved method of producing molten metal from a metal oxide in powder or lump form, by passing said metal oxide downwardly towards an electrically heated smelting furnace and subjecting the downwardly moving oxide to the action of reducing gases before entry into the smelting furnace, in which the improvement comprises dividing the reduction of the metal oxide to molten metal into a pre-reduction step wherein the downwardly moving oxide is partially reduced in a pre-reduction furnace above the smelting furnace but remains substantially solid, and an end-reduction step wherein the partially reduced substantially solid oxide is converted to molten metal in the smelting furnace, by the following combination of features:

a. the end reduction of the partially reduced substantially solid oxide is effected by feeding into the smelting furnace a reducing agent selected from the group comprising solid, liquid and gaseous carbonaceous and hydrocarbon-containing carbonaceous materials, to produce substantially complete reduction of the oxide to molten metal with evolution of hot reducing gases, containing a substantial amount of hydrocarbons;

b. introducing the hot reducing gases from said smelting furnace upwardly to the discharge end of the downwardly moving oxide; and c. cooling said hot reducing gases substantially before or at the region of introduction thereof by mixing therewith a cooling agent, selected from solid, liquid and gaseous cooling agents, adapted both to produce a lower temperature of the hot reducing gases sufficient to prevent agglomeration of the pre-reduced substantially solid oxide before it enters the smelting furnace, and also to provide an increase in the molar amount of reducing gases available for the prereduction step by endothermic reforming reaction with hydrocarbons to CO and $H_2$.

2. A method according to claim 1, which includes adjusting the temperaature of the smelting furnace to control the temperature of the hot reducing gases upwardly entering the discharge end of the downwardly moving partially reduced oxide, and controlling the rate of introduction of said cooling agent to maintain a desired temperature and a desired molar quantity of the hot reducing gases in the pre-reduction step.

3. A method according to claim 1 characterized by carrying out from 20% to 80% of the total reduction of the oxide in the pre-reduction furnace.

4. A method according to claim 1 characterized by producing metallic iron from a starting material selected from the group comprising $Fe_2O_3$ and $Fe_3O_4$ with a grain size in the range of 0.1 to 15 mm and maintaining an inlet temperature of the reducing gases introduced into the pre-reduction furnace after cooling thereof by the cooling agent in the range of 700°C to 1200°C.

5. A method according to claim 1 in which a reaction layer is maintained in the smelting furnace for final reduction by the reducing agent, characterized in that this reducing agent is injected into the smelting furnace for final reduction through nozzles placed in the furnace walls and roof above the surface of the reaction layer in such an arrangement so as to give an even distribution of the reducing agent onto the surface of the reaction layer.

6. A method according to claim 1, characterized by injecting the reducing agent into the furnace through nozzles placed in the walls of the furnace near the surface of the metal bath so as to create by gaseous reducing constituents introduced into the furnace an emulsion containing liquid slag and metal mixed with prereduced metal oxides in which the final reduction takes place.

7. A method according to claim 1, characterized in that the heating energy necessary for final reduction is generated by conducting an electric current through a layer of prereduced metal oxide and reducing agent floating on the layers of slag and molten metal accumulated into the lower part of the device.

8. A method according to claim 7, characterized by supplying the electric energy to the conducting layer in which the final reduction is carried out through water-cooled electrodes essentially made of metal or through electrodes consisting of graphite or a carbon mass which can be fed continuously into the furnace so as to maintain contact with the conducting layer in spite of the electrodes being burnt off.

9. A method according to any of the claims 1, characterized by the heating of the smelting furnace for final reduction through electric induction primarily using alternating current of a high to normal frequency.

10. A method according to any of the claims 1, characterized by the spreading of the prereduced metal oxide emerging from the upper part of the device over the layer or emulsion existing in the smelting furnace for final reduction by means of a rotating disc.

11. A method according to claim 1, characterized by the prereduction of metal oxide in the upper part of the device being carried out in a vertical multiple hearth furnace centrally placed over the lower smelting furnace for final reduction.

12. A method according to claim 1, characterized by the prereduction being carried out in a rotary furnace arranged over the smelting furnace for final reduction in which the gases leaving the smelting furnace are fed to the rotary furnace through that end of this furnace where prereduced metal oxide is fed out to the central part of the smelting furnace.

13. A method according to claim 1, characterized by the prereduction being carried out in at least one furnace of the type comprising fluidized bed and cyclone furnaces arranged over the smelting furnace for final reduction in which the reducing gases leaving the smelting furnace are given a pressure high enough to create the desired agitation of the metal oxide in such prereduction devices.

14. A method according to claim 1, characterized in that remaining combustible components in the waste-gas from the prereduction is burned by the addition of air and that the heat then evolved is used for drying the preheating moist and cold metal oxides used as a raw material feed.

15. A method according to claim 14, characterized in that the combustion of the waste-gas from the prereduction is carried out in a part of the device which is separated from the part of the device where prereduction is carried out.

16. A method according to claim 14, characterized in that the hot outgoing waste-gases from the device are passed through a heat exchanger where air for the combustion of waste-gases from the prereduction is preheated.

17. A method according to claim 1, characterized in that waste-gases from the device are fed to a waste-gas boiler plant where the heat content is utilized.

18. A method according to claim 1, characterized in that metal oxide is fed into the upmost part of the device through a gastight feeding device.

19. A method according to claim 1, characterized in that an additive selected from the group comprising natural, burnt and slaked limestone and dolomite stone is fed into the device together with the metal oxide.

20. A method according to claim 1, characterized in that an additive selected from the group comprising natural, burnt and slaked limestone and dolomite stone is fed into the smelting furnace for final reduction directly onto the electrically heated layer in which final reduction is carried out.

21. A method according to claim 1, characterized in that metal oxide and reducing agent are continuously fed to the device.

22. A method according to claim 1, characterized in that tapping of molten slag and metal formed in the process is made continuously.

23. A method according to claim 1, characterized in that the quantity of cooling media added to the reducing gas is automatically regulated to give the desired temperature in the prereduction step in which a temperature measuring instrument inserted into the path of the reducing gas acts as an impulse generator.

24. A method according to claim 1, characterized in that the supplied electrical energy is automatically regulated so as to give the desired temperature in the zone of final reduction.

25. A method according to claim 1, characterized by selecting the quantity and composition of the cooling agent so as to increase the number of moles of reducing gas transferred into the prereduction furnace.

26. A method according to claim 1, characterized by reducing the temperature of the reducing gas transferred from the smelting furnace to the prereduction furnace with at least 100°C, preferably at least 200°C and especially at least 400°C but not above 900°C and especially not above 600°C.

27. A method according to claim 1, characterized in that not more than 10–30 % of the total reduction is carried out with liquid or solid reducing agents which are mixed into the charge in the prereduction furnace, corresponding to a content of not more than about 3–10 % of carbon based on the weight of the metal oxide charge in the prereduction furnace.

28. A method according to claim 1, characterized by producing a metal selected from the group comprising iron, copper, nickel, cobalt, tin, manganese, chromium, zinc and lead.

29. A method according to claim 1, characterized in that the cooling agent is selected from the group comprising water, water vapour, carbon dioxide, hydrocarbons, carbon dioxide releasing solids and water releasing solids.

30. A method according to claim 1, characterized in that desulphurizing of the metal is made by blowing a desulphurizing agent into the metal melt through a lance.

31. A method according to claim 3, characterized by carrying out from 50% to 70% of the total reduction in the pre-reduction furnace.

32. A method according to claim 1, characterized by cooling said reducing gases at least 100°C. with said cooling agent.

33. A method according to claim 32, characterized by cooling said reducing gases at least 200°C. with said cooling agent.

34. A method according to claim 33, characterized by cooling the hot reducing gas in step C to the highest possible temperature which prevents agglomeration.

35. A method according to claim 33, characterized by cooling said reducing gases at least 400°C. with said cooling agent.

36. A method according to claim 1, characterized by introducing in addition to the endothermically reacting cooling agent also other cooling agents.

37. A method according to claim 35, characterized by introducing the endothermically reacting cooling agent into the smelting furnace together with the reducing agent.

38. A method according to claim 1, characterized in that the total atomic ratio C/H of the reducing agent supplied to the smelting furnace is not above 1:0.5.

39. A method according to claim 36, characterized in that the total atomic ratio C/H of the reducing agent supplied to the smelting furnace is not above 1:1.

* * * * *